(12) United States Patent
Kammerer et al.

(10) Patent No.: US 10,440,124 B2
(45) Date of Patent: Oct. 8, 2019

(54) SEARCHABLE DIRECTORY FOR PROVISIONING PRIVATE CONNECTIONS

(71) Applicant: Cloud9 Technologies, LLC, New York, NY (US)

(72) Inventors: Stephen J Kammerer, Peekskill, NY (US); Gregory Kenepp, Bridgewater, NJ (US); Leonidas P Papadopoulos, Ridgefield, CT (US)

(73) Assignee: Cloud9 Technologies, LLC, New York, NY (US)

( * ) Notice: Subject to any disclaimer, the term of this patent is extended or adjusted under 35 U.S.C. 154(b) by 303 days.

(21) Appl. No.: 15/358,063

(22) Filed: Nov. 21, 2016

(65) Prior Publication Data

US 2017/0155722 A1 Jun. 1, 2017

Related U.S. Application Data

(60) Provisional application No. 62/261,232, filed on Nov. 30, 2015.

(51) Int. Cl.
| | |
|---|---|
| *H04L 29/08* | (2006.01) |
| *G06Q 10/10* | (2012.01) |
| *H04L 12/18* | (2006.01) |
| *H04L 12/58* | (2006.01) |
| *G06F 3/0484* | (2013.01) |

(Continued)

(52) U.S. Cl.
CPC .......... *H04L 67/141* (2013.01); *G06F 3/0482* (2013.01); *G06F 3/0484* (2013.01); *G06Q 10/101* (2013.01); *H04L 12/1818* (2013.01); *H04L 51/32* (2013.01); *H04L 63/0428* (2013.01)

(58) Field of Classification Search
CPC .......... G06Q 10/10–103; G06Q 10/109–1095; G06Q 50/01; H04L 51/32; H04L 12/1813–1827; H04L 65/1066–1069; H04L 67/141
See application file for complete search history.

(56) References Cited

U.S. PATENT DOCUMENTS 5,642,156 A * 6/1997 Saiki .................. H04N 7/15
348/14.09
6,466,550 B1 * 10/2002 Foster ................ H04L 12/1813
370/261

(Continued)

OTHER PUBLICATIONS

"VPN", Newton's Telecom Dictionary, 21st ed., Mar. 2005.*

(Continued)

*Primary Examiner* — Brendan Y Higa
(74) *Attorney, Agent, or Firm* — FisherBroyles LLP; Richard M. Lehrer (57) ABSTRACT

Systems and methods are provided for setting up persistent, secure communication channels between remote groups of individuals over an unreliable network such as a packet switched or frame relay network. A group, which could be an individual, searches for another group, which could be an individual, through a hierarchical search structure. When the search results in a group that the searching group wants to communicate with, the searching group sends an invitation to the identified group and when the invitation is accepted a persistent communication channel is configured between the two groups.

24 Claims, 11 Drawing Sheets

(51) Int. Cl.
*G06F 3/0482* (2013.01)
*H04L 29/06* (2006.01)

(56) References Cited

U.S. PATENT DOCUMENTS

| | | | | |
|---|---|---|---|---|
| 6,755,743 B1* | 6/2004 | Yamashita | ............ | A63F 13/005 |
| | | | | 463/42 |
| 8,694,593 B1* | 4/2014 | Wren | ...................... | G06Q 50/10 |
| | | | | 709/206 |
| 9,178,773 B1* | 11/2015 | Tassone | ................ | G06F 3/0481 |
| 9,881,282 B1* | 1/2018 | Narayanaswamy | .... | H04M 3/56 |
| 2002/0001302 A1* | 1/2002 | Pickett | ................ | H04L 12/2856 |
| | | | | 370/352 |
| 2002/0118808 A1* | 8/2002 | Kelleher | ................. | H04M 3/56 |
| | | | | 379/202.01 |
| 2002/0156901 A1* | 10/2002 | Erickson | ................. | H04L 29/06 |
| | | | | 709/227 |
| 2003/0208600 A1* | 11/2003 | Cousins | ................. | H04L 29/06 |
| | | | | 709/227 |
| 2007/0218900 A1* | 9/2007 | Abhyanker | .......... | G06Q 10/087 |
| | | | | 455/435.1 |
| 2008/0108438 A1* | 5/2008 | Sugiyama | ................ | A63F 13/12 |
| | | | | 463/42 |
| 2009/0262668 A1* | 10/2009 | Hemar | .................. | G06Q 30/02 |
| | | | | 370/260 |
| 2010/0017371 A1* | 1/2010 | Whalin | .................. | G06Q 10/06 |
| | | | | 707/E17.014 |
| 2010/0211626 A1* | 8/2010 | Li | ....................... | H04L 67/2861 |
| | | | | 709/203 |
| 2011/0289433 A1* | 11/2011 | Whalin | .................. | G06Q 10/10 |
| | | | | 715/753 |
| 2011/0307496 A1* | 12/2011 | Jones | ...................... | G06F 16/24 |
| | | | | 707/748 |
| 2012/0023072 A1* | 1/2012 | Garg | ...................... | G06Q 10/10 |
| | | | | 707/689 |
| 2013/0110836 A1* | 5/2013 | Tomberg | ................ | G06Q 10/10 |
| | | | | 707/737 |
| 2014/0082101 A1* | 3/2014 | Wable | .................. | H04L 67/306 |
| | | | | 709/206 |
| 2015/0111553 A1* | 4/2015 | Efrati | .................. | H04L 12/1818 |
| | | | | 455/416 |
| 2016/0284031 A1* | 9/2016 | Quon | ...................... | H04W 4/21 |
| 2017/0201391 A1* | 7/2017 | Kammerer | .......... | H04L 65/1006 |
| 2017/0339535 A1* | 11/2017 | Mazzarella | ............. | H04M 3/56 |
| 2018/0077542 A1* | 3/2018 | Xie | ........................ | G06Q 50/01 |

OTHER PUBLICATIONS

"Hierarchical file system", Newton's Telecom Dictionary, 21st ed., Mar. 2005.*

"Persistent connection (HTTP persistent connection)". https://whatis.techtarget.com/definition/persistent-connection-HTTP-persistent-connection. Jun. 2016.*

* cited by examiner

SEARCHABLE DIRECTORY FOR PROVISIONING PRIVATE CONNECTIONS

CROSS REFERENCE TO RELATED APPLICATIONS

This application claims the benefit of the filing date of U.S. provisional patent application No. 62/261,232 entitled "Searchable Directory for Provisioning Private Connections", which was filed on Nov. 30, 2015, by the same patentee of this application and which shares the same inventor as this application. That provisional application is hereby incorporated by reference as if fully set forth herein.

FIELD OF THE TECHNOLOGY

The technology of this application relates generally to network based communications, and more specifically but not exclusively to generating one or more persistent communication connections and/or constant, secure communication channels between users or groups of users.

BACKGROUND OF THE TECHNOLOGY

Traders at a financial institution often need quick, relatively instantaneous, secure access to traders at other financial institutions who trade in the same or similar products. As such, financial institutions historically pay large fees to set up direct connections over the Public Switched Telephone Network (PSTN) and/or legacy Time Division Multiplexed (TDM) networks from their trading desks to similar trading desks at other financial institutions. Such connections are typically time consuming to setup and expensive to setup and maintain.

It would be advantageous to create a relatively inexpensive system for use with the Internet or some other wide area network, which provides continuous and/or substantially instant access between groups of individuals.

BRIEF SUMMARY OF THE TECHNOLOGY

Many advantages will be determined and are attained by one or more embodiments of the technology, which in a broad sense provides a system for creating constant, secure communication channels between groups of users located apart from each other.

One or more embodiments of the technology provides a method for setting up persistent, secure communication channels between customer premises equipment which is running customer premises software (collectively referred to as CPS) respectively associated with groups of individuals who share at least one common trait. The method includes identifying, by performing with a CPS a search, a remote group who shares at least one trait with the group performing the search, generating at the CPS an invitation for the remote group to connect with the group performing the search, and a server setting up communication channels, via a packet switched network, between the CPS associated with the group who performed the search and the CPS associated with the invited group in response to the invited group accepting the invitation.

One or more embodiments of the technology provides a method for setting up persistent, secure communication channels between CPSs respectively associated with groups of individuals who share at least one common trait. The method includes a group receiving an invitation, at a CPS associated with the group, to connect with a CPS associated with the group who sent the invitation. The group receiving the invitation accepts the invitation and transmits the acceptance via the associated CPS to a server. The server sets up communication channels, via a packet switched network, between the CPS associated with the group who received the invitation and the CPS associated with the group that sent the invitation.

One or more embodiments of the technology provides a system for secure communications between groups of people located remote from each other. The system includes a CPS associated with at least one group. The CPS includes a graphical user interface, and a first non-transitory computer readable medium storing instructions for a software application ("app"). When executed, the app displays a hierarchical list of remote groups, each having at least one trait in common with the at least one group, detects a selection from the list of groups and sends an invitation to the selected group to connect with the at least group. The system also includes a server having another non-transitory computer readable medium storing instructions that when executed by a processor cause the server to determine that the invitation was accepted, and configure a persistent communication channel. The persistent communication channel is configured over an unreliable network between the CPS associated with the at least one group and the CPS associated with the selected group.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with the accompanying drawings, in which like reference characters refer to like parts throughout, and in which.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE TECHNOLOGY

Referring to the figures in detail wherein like reference numerals identify like elements throughout the various figures, there is illustrated in FIGS. 1-10 improved techniques for configuring secure, persistent communication channels over packet switched network(s) between/among groups of individuals who share common traits/attributes (these terms will be used interchangeably herein). A common trait refers to, but is not limited to, things that users share such as being a member of the same group, being an employee and/or owner of the same company, trading in the same commodities, resources, etc., being a member of the same department of a company or of different companies, etc. One or more embodiments of the technology enable(s) a user or group to setup a communication channel with another group over a packet switched network by searching for existing groups through a hierarchy list and sending an invitation to one or more of the groups. When the group accepts the invitation, one or more persistent voice, video and/or text channels is/are setup between the individual/group and the invited group. One or more of the channels may be encrypted. Once the communication channels are set up, in addition to being able to communicate with the remote group, a member of one of the groups may select the connection to determine the type of connection and the members of the group. In one or more embodiments, a server coordinates the communication connection(s) between the individual and group. The individual or group communicates with the server via a customer premise equipment (CPS) such as a computer, which is also used to communicate with other individuals/groups. The following description will be limited to the financial industry and in particular trading desks at financial institutions. However, those skilled in the art will recognize that the system could be employed by any group of people.

Discussion of an embodiment, one or more embodiments, an aspect, one or more aspects, a feature, one or more features, or a configuration or one or more configurations is intended be inclusive of both the singular and the plural depending upon which provides the broadest scope without running afoul of the existing art and any such statement is in no way intended to be limiting in nature. Technology described in relation to one or more of these terms is not necessarily limited to use in that particular embodiment, aspect, feature or configuration and may be employed with other embodiments, aspects, features and/or configurations where appropriate.

Figure 1:
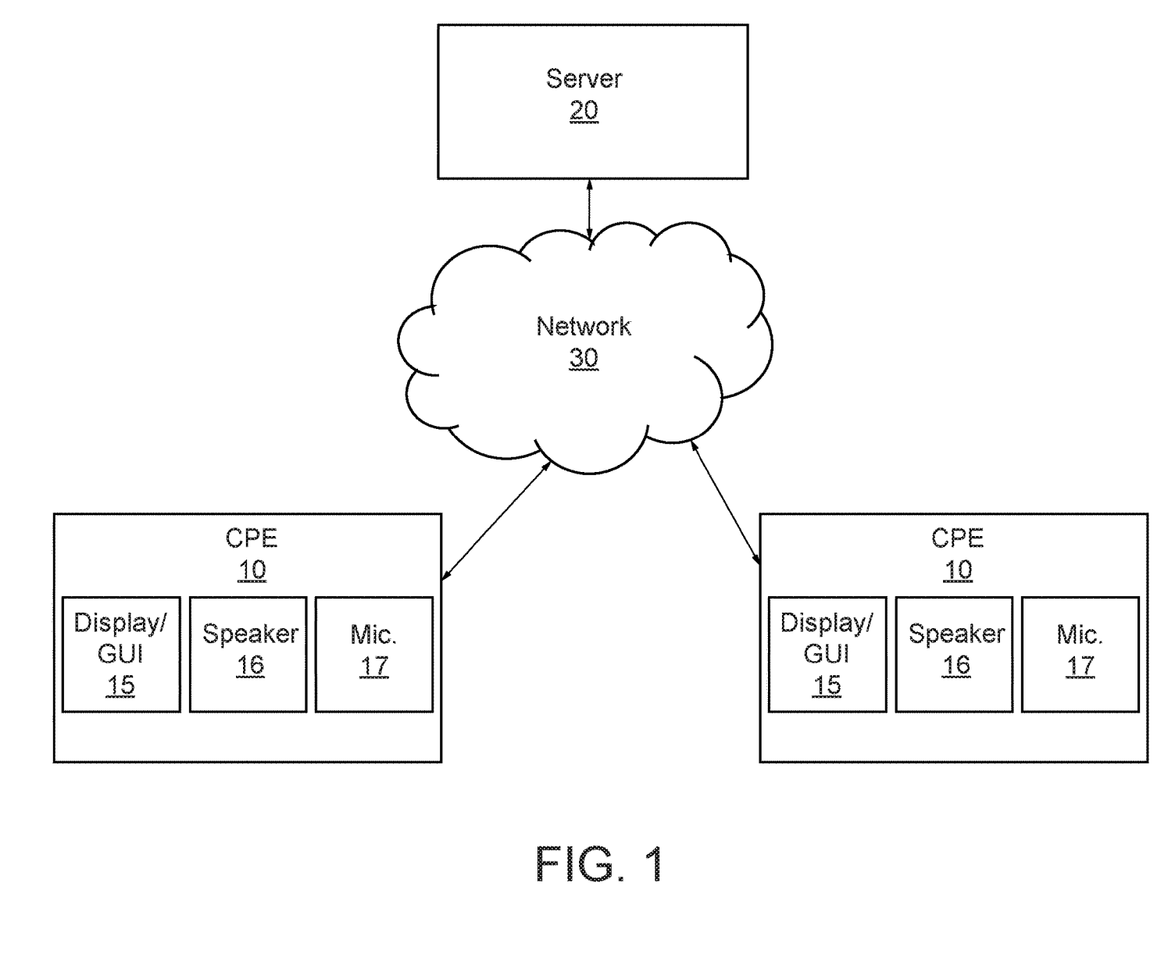
FIG. 1 illustrates a graphical user interface showing various available network communication channels in accordance with one or more aspects of the technology.

FIG. 1 illustrates an exemplary system in accordance with one or more aspects of the disclosed technology. The system includes multiple CPSs 10, a server 20 and a packet switched network 30. The CPSs 10 include a display 15, speaker 16 and microphone 17. Those skilled in the art will recognize that the number of CPSs 10, servers 20 and networks 30 illustrated is merely for descriptive purposes only and is not considered a limitation on the system. The system could include additional CPSs 10, servers 20 and networks 30 and still fall within a scope of one or more claims. Both the CPSs 10 and the server 20 include various standard conventional elements (not shown) such as a processor that executes executable program code and/or accesses information stored in a memory or storage. The memory/storage may include a non-transitory, computer-readable medium which stores instructions which, when executed by the processor, cause the processor to perform the operations described herein. The standard elements may also include external or internal devices such as input/output devices and an interface thereto that can receive input from input devices or provide output to output devices. A communication interface which includes any device or group of devices suitable for establishing a wired or wireless data connection to one or more data networks and one or more busses which is/are used for communications between the various standard elements.

Figure 1A:
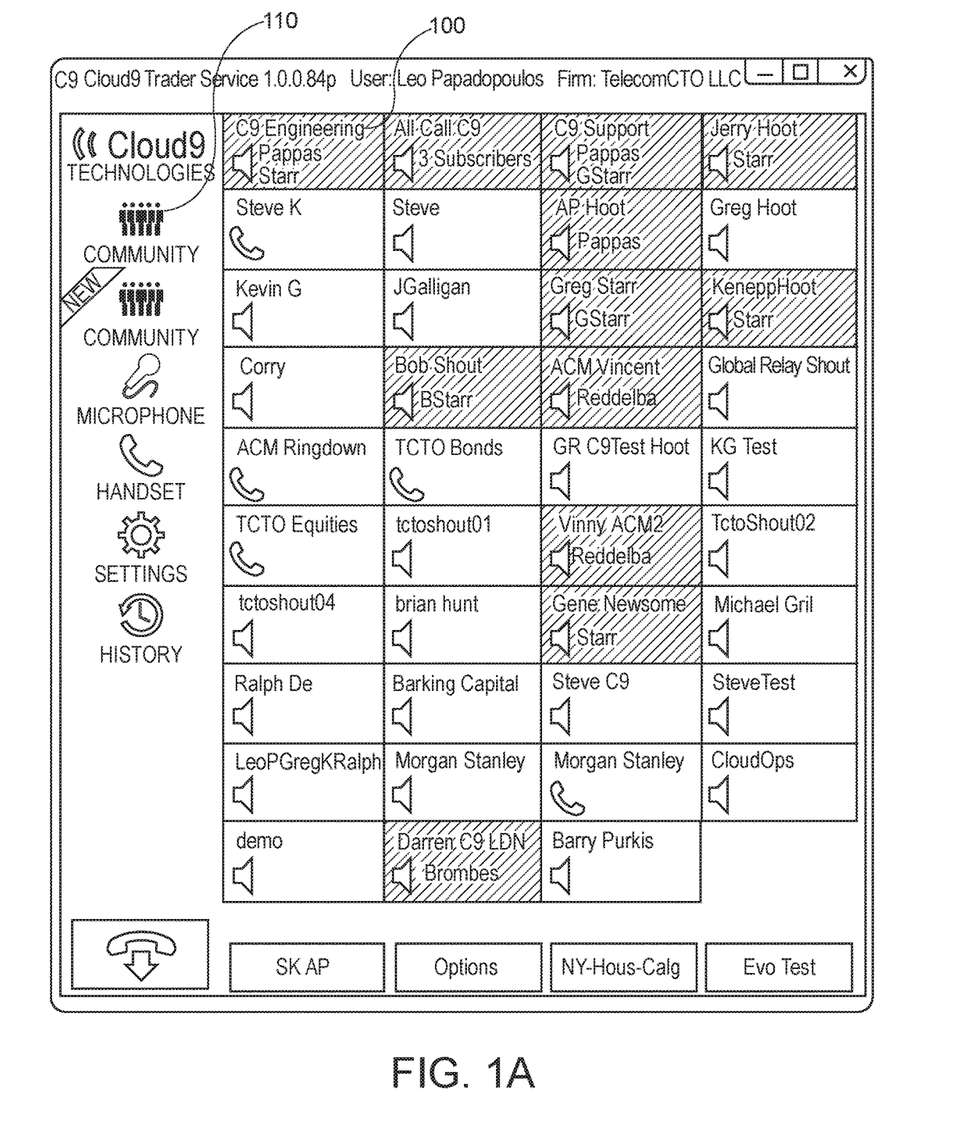
FIG. 1a illustrates a graphical user interface showing various available network communication channels in accordance with one or more aspects of the technology.

FIG. 1a illustrates a graphical user interface ("GUI")/display 15 associated with CPS 10 showing various existing connections 100 that have been set up for a particular user. When the user logs on to the system, this is a possible default screen, although this is a design choice and another screen could be set as the default screen. Additionally, the number of connections illustrated is merely to assist in the description of the technology and is not a limitation on the technology. The first time a user logs into the system it is possible that there will be no connections available, or there may be one or more default connections. Additionally, once the number of connections fills the screen, the images could become smaller to fit additional connections or the screen could scroll to include additional connection or there could be a page turning mechanism for additional connections. By way of an example, if the user wishes to communicate with Steve, the user selects the Steve button and is instantly connected via an encrypted voice over internet protocol ("VoIP") connection, voice over frame relay ("VoFR") connection or some other packet switched network connection. As illustrated by the various different images (and some which are not illustrated, the connection may employ a speakerphone, a telephone handset, may be an instant message connection or a video connection). The connection indication boxes 100 may include information such as the type of connection (e.g. private line connections, shout down connections, Hoot & Holler connections, voice, video, text, etc.), the name of the individual or group, the status of the connection (e.g. in use/not in use) and/or any other information determined to be relevant by the system administrator.

Figure 2:
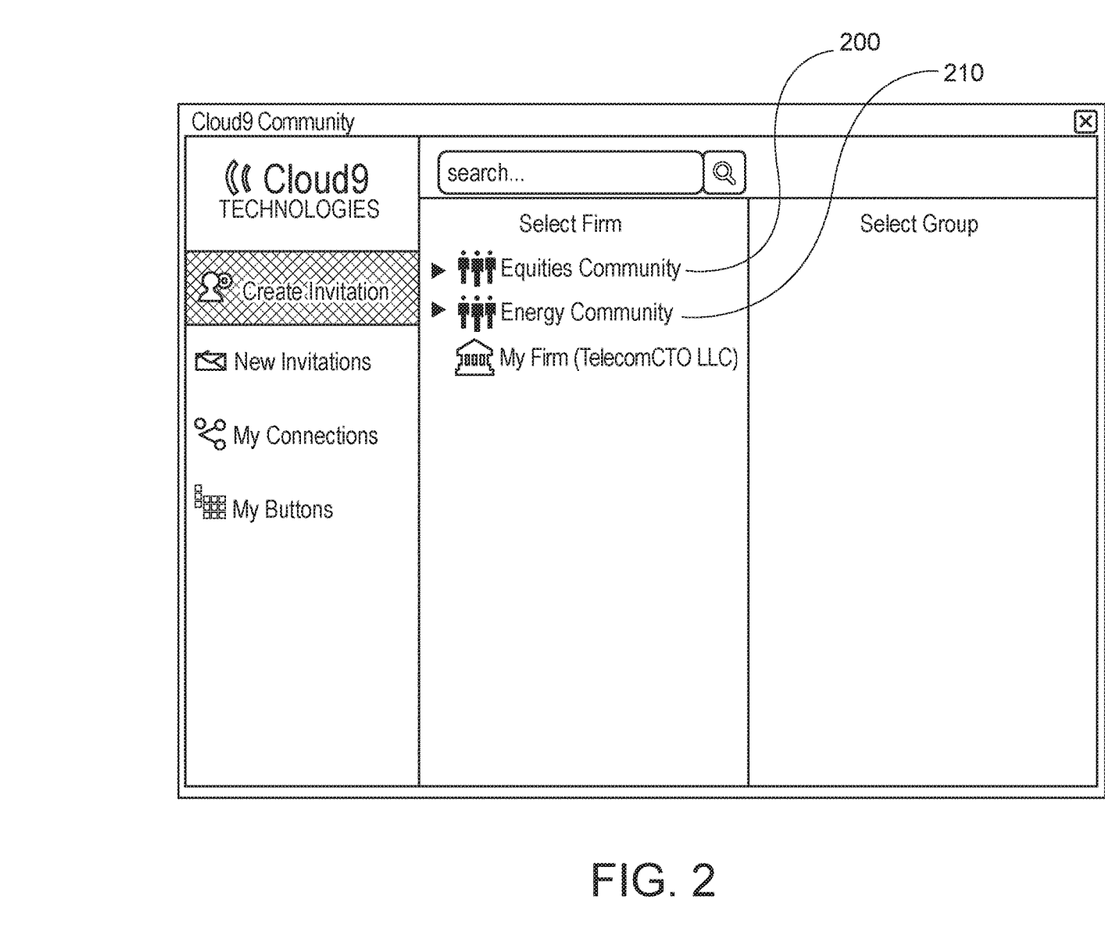
FIG. 2 illustrates a graphical user interface showing an option for adding a new communication channel to the channels of FIG. 1.
Figure 3:
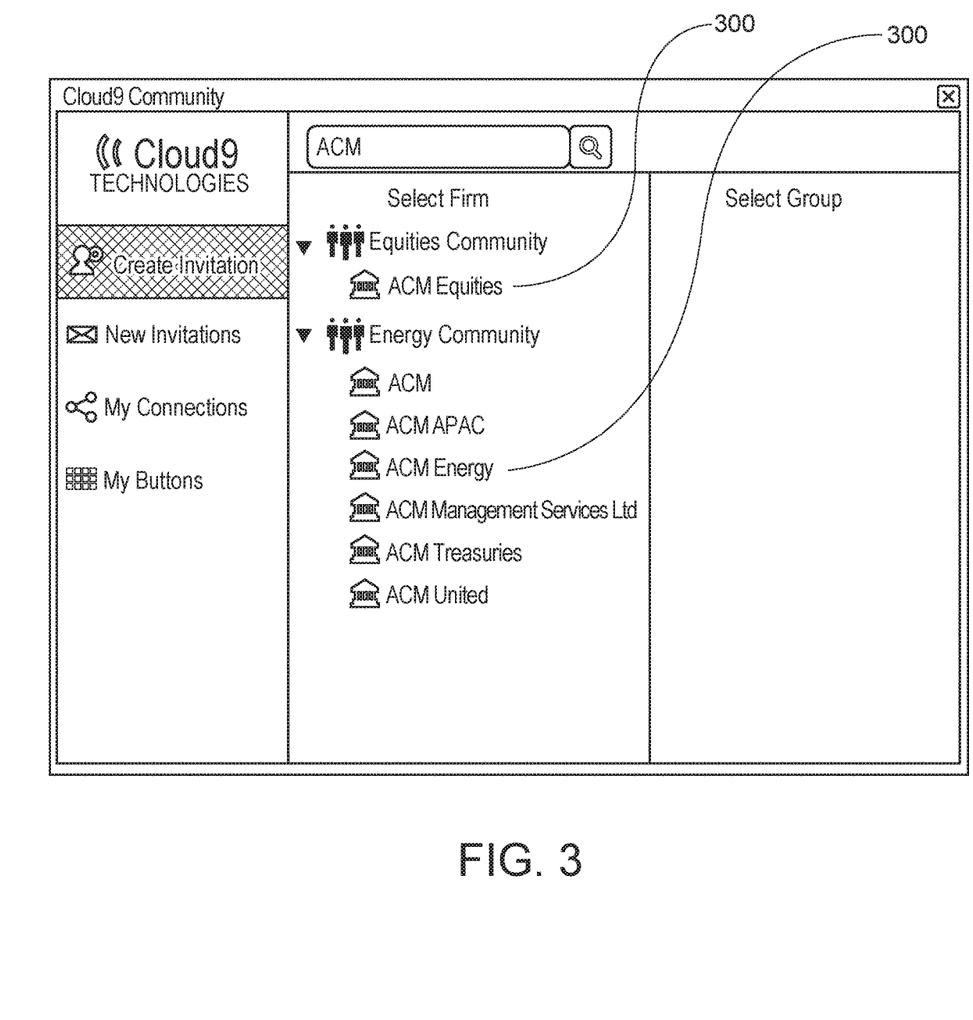
FIG. 3 illustrates a graphical user interface showing a search for a group with whom to form a new communication channel to add to FIG. 1.
Figure 4:
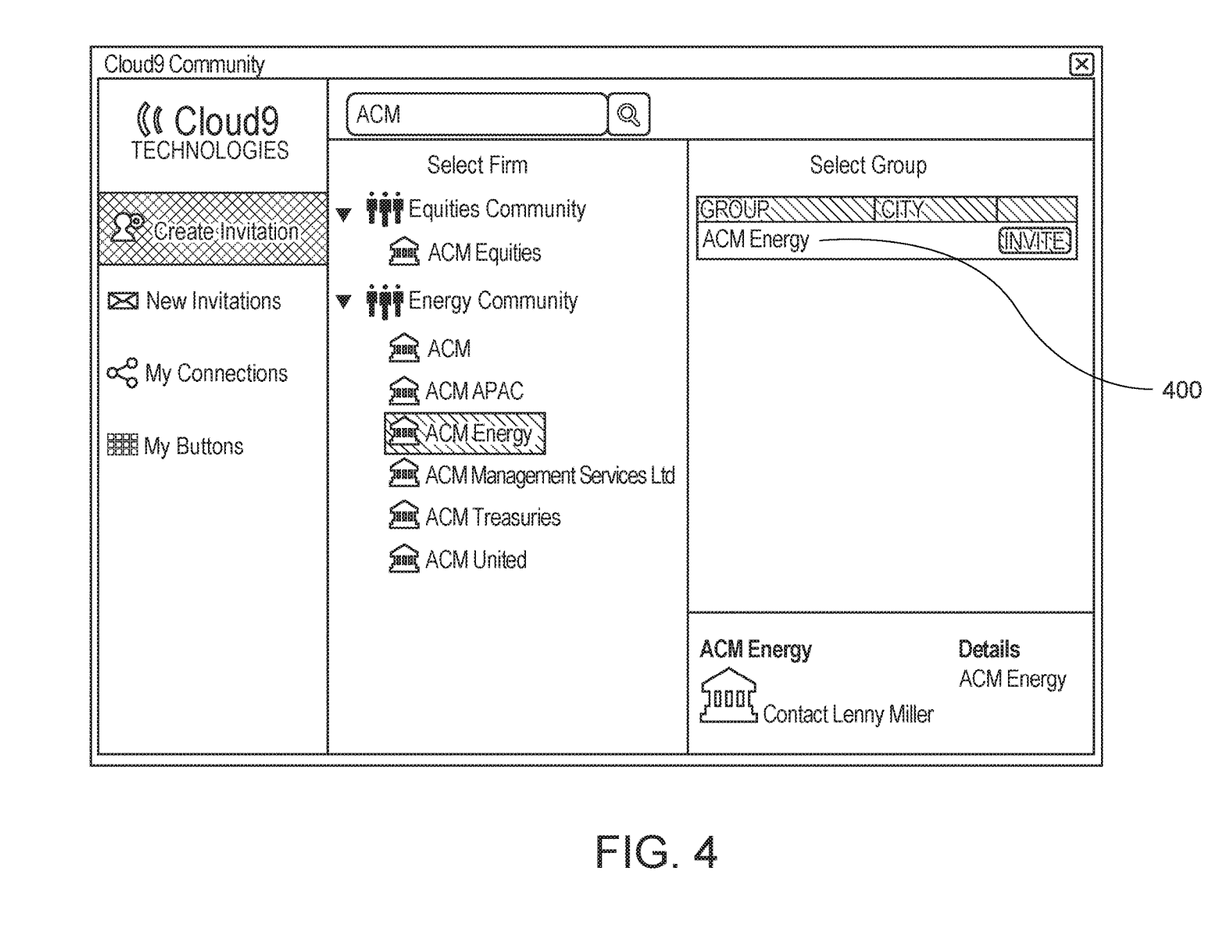
FIG. 4 illustrates a graphical user interface showing a selection of a subgroup with whom to form a new communication channel to add to FIG. 1.

FIGS. 2-6 illustrate the graphical user interfaces employed when setting up a new connection between groups. The initial option (FIG. 2) is a selection of a top level group (also referred to as the community level). Communities are the broadest level of commonality between/among users. A user selects the community button 110 (FIG. 1a) which opens the GUI of FIG. 2. Only communities with which the user is associated will be displayed. As illustrated in FIG. 2, only the Equities 200 and Energy 210 communities are displayed. This is because the logged in user performing the search is a member of the Equities 200 and Energy 210 communities. Other communities with which the logged in user is not associated are not displayed. This aspect of the invention is important for the financial industry due to regulatory requirements, however it is not necessarily a requirement of the invention. In other words, while not preferred, in one or more configurations the user may be provided and allowed to select a community with which the user is not associated. The next level of commonality, as illustrated in FIG. 3, is the group/firm level 300. The user will be provided a list of firms that fall within the available communities and/or provided the option to search for a group/firm that belongs to the available communities. For each group/firm 300 selected, the available sub-groups/ trading desks 400 will be listed beneath the available community for selection (FIG. 4). Once the trading desk/group 400 is selected, as illustrated in FIG. 4, the user may be provided with the option to send an invitation to that trading desk 400 to establish a connection. Those skilled in the art will recognize that the option to send an invitation may be provided at any/all levels of the hierarchy and still fall within the scope of one or more claims.

Figure 5:
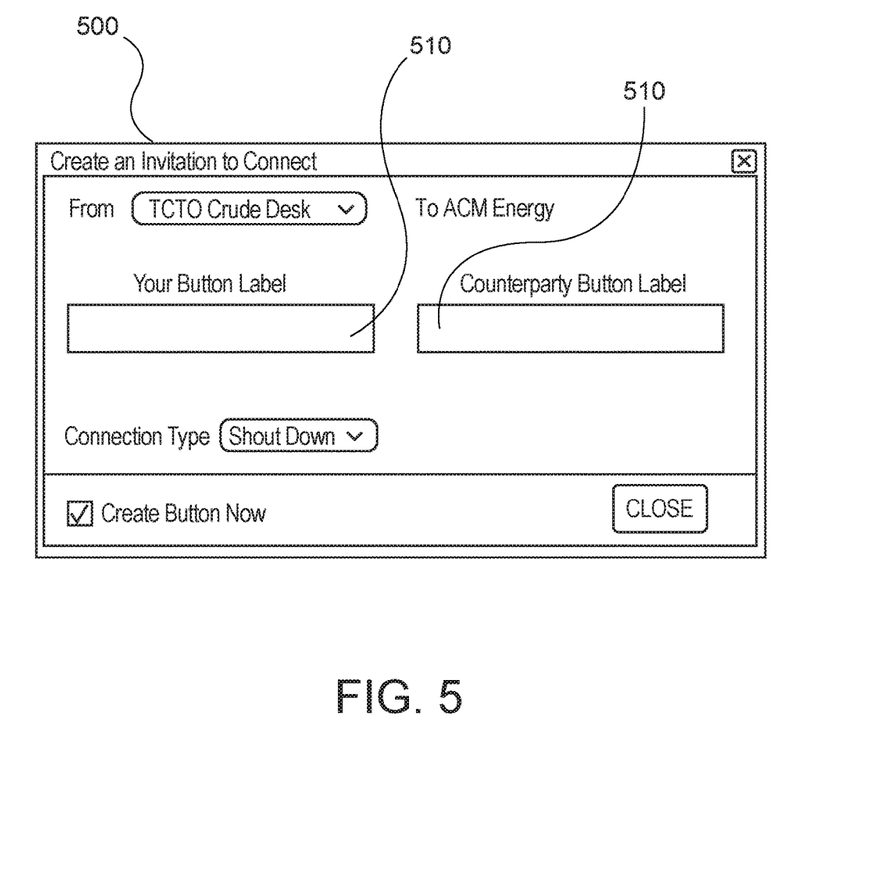
FIG. 5 illustrates a graphical user interface showing creation of an invitation to the selected subgroup to form a new communication channel to add to FIG. 1.
Figure 6:
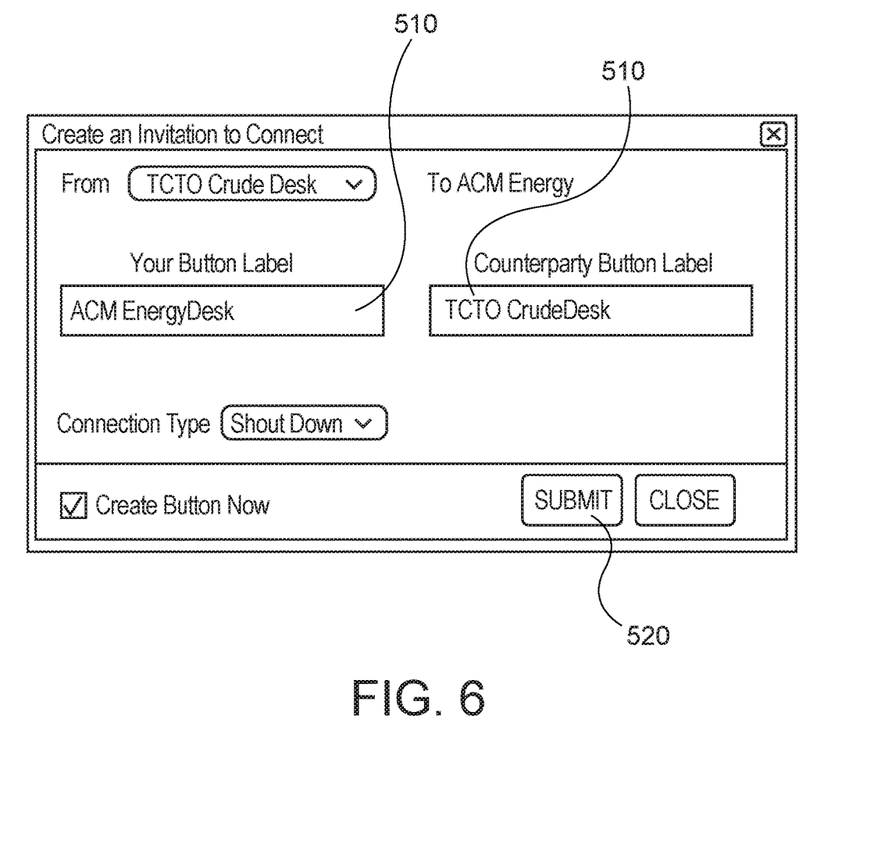
FIG. 6 illustrates a graphical user interface showing labels to add to the new communication channel to add to FIG. 1.

FIG. 5 illustrates an invitation screen 500 showing various fields 510 that may be selected and filled (e.g. the person/group sending the invitation, the invitee, labels for the buttons to be presented on the default screen and the type of connection to create). Once enough of the fields 510 are populated (FIG. 6), the user sends the invitation by selecting the submit or send button 520.

The above group levels apply to the trading industry but may also be applicable to other industries. For example, public safety could be configured with a top level=locality, the next level=Fire, Police, Ambulance, and the bottom level=Fire House, Police Station, Ambulance Squad. Those skilled in the art will recognize that this is merely a possible non-limiting example and other level configuration are possible.

Figure 7:
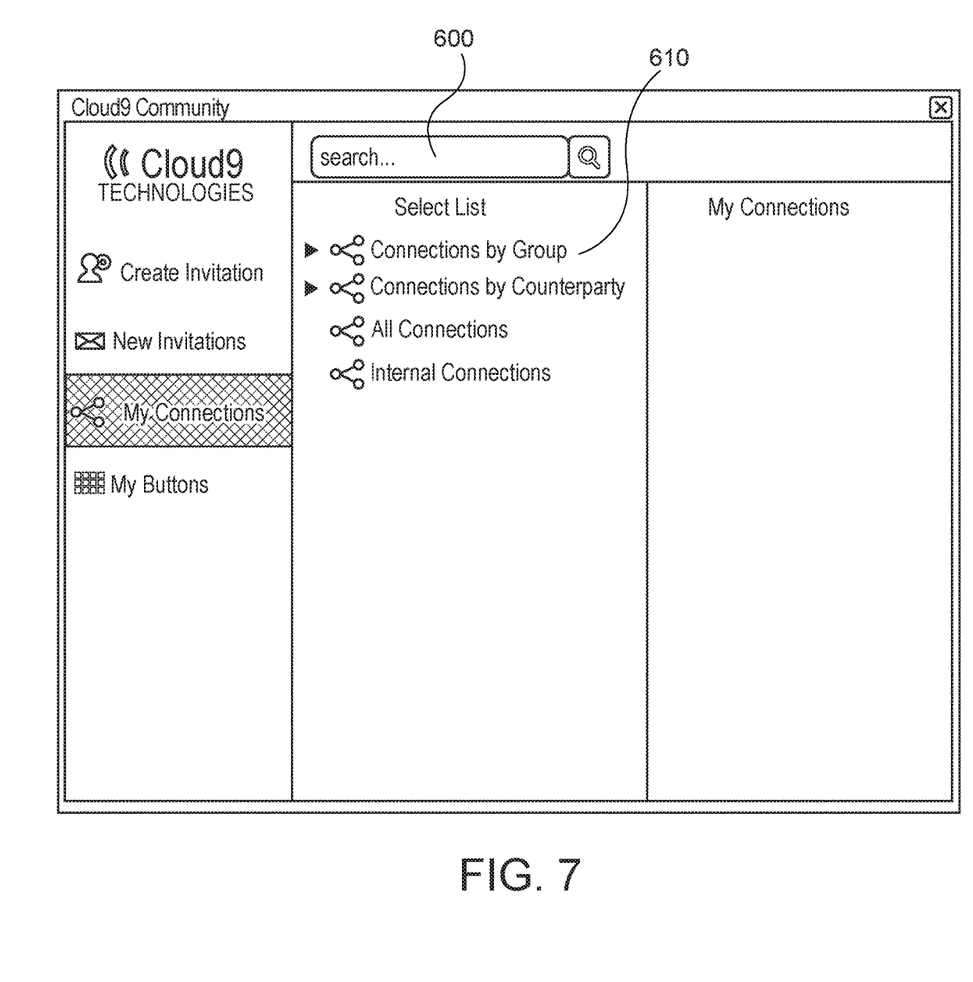
FIG. 7 illustrates a graphical user interface showing a status search for all invitations.
Figure 8:
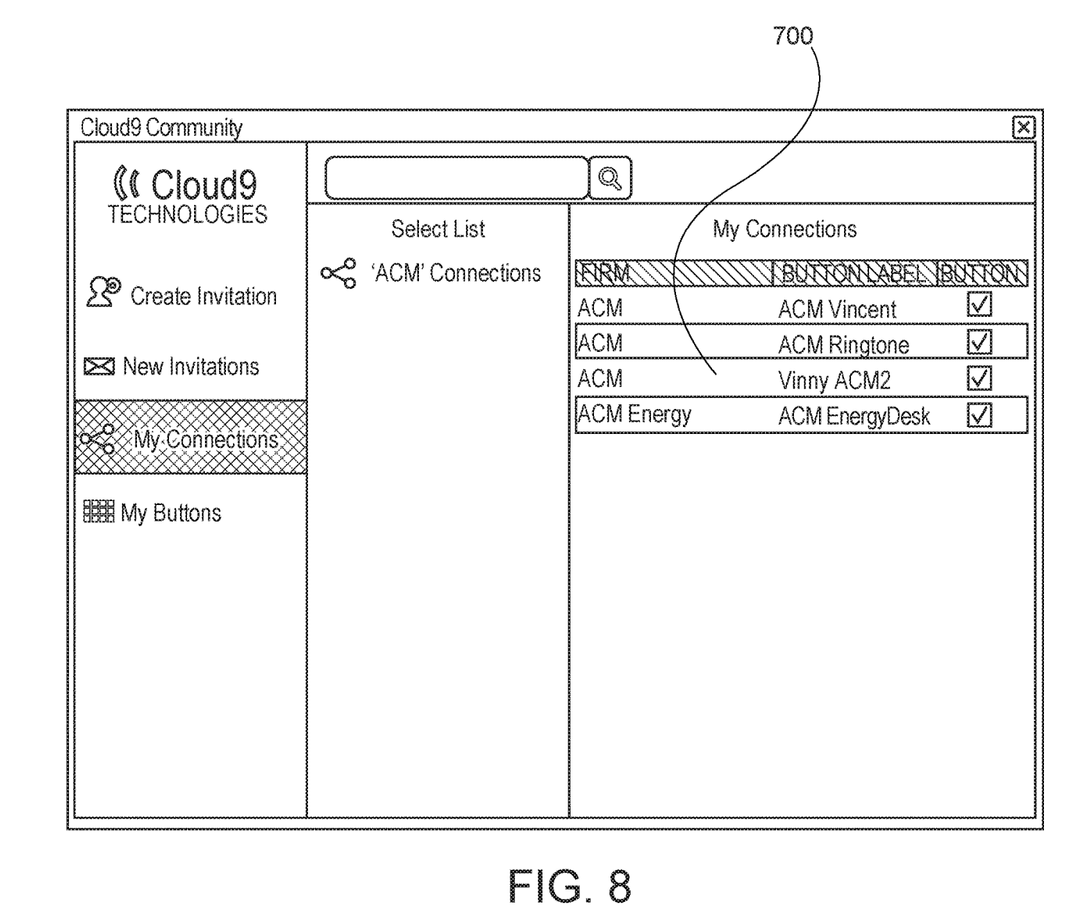
FIG. 8 illustrates a graphical user interface showing a status of the invitation from FIG. 5.
Figure 9:
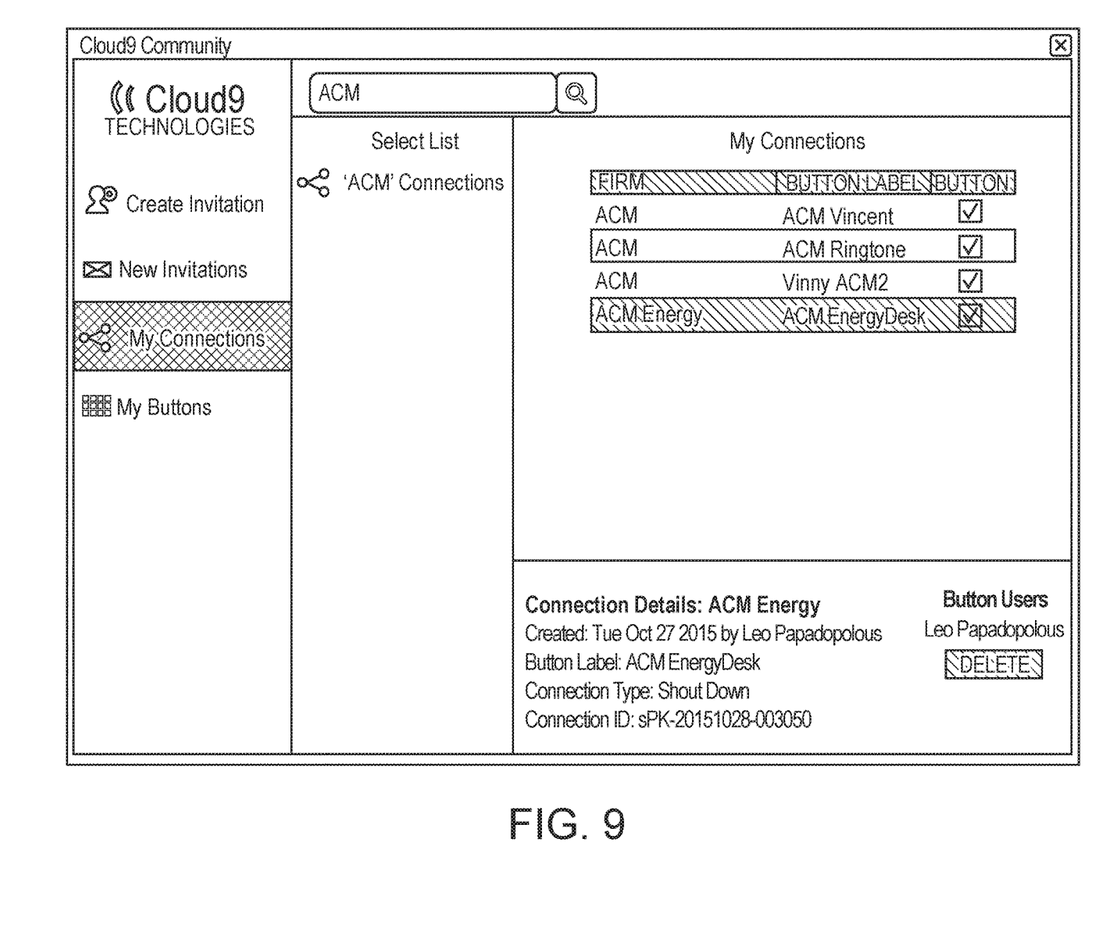
FIG. 9 illustrates a graphical user interface showing details of a selected connection; and, FIG. 10 is a flow chart illustrating a method for creating a communication channel in accordance with one or more aspects of the technology.

FIGS. 7-9 illustrate display screens illustrating how one may check the status of an invitation. As illustrated in FIG. 7, the user may search by entering the name of the invitation into the search field 600 or the user may select from a list of invitations 610. Once the invitation is located by the CPS and/or the server, the status 700 of the invitation is displayed (FIG. 8) including the members of the group that was invited. If the invitation was accepted, the user may select a particular connection and the system will display information about the connection. This information may include one or more of the following: the group name, the date of creation, the button label on the local system, the connection type and the connection ID. The information may include additional information or less information about the connection depending on the design choice of the system.

By default, every time a connection is configured between groups there are multiple connections configured (voice, video and instant message). It is preferable but not required that one or more of these connections be encrypted. Those skilled in the art will recognize that this is a design choice and the number and types of connections may vary and some connections may be encrypted while others may not require encryption. Since the method for setting up a voice, video and instant message connection is well known, no further description will be included. Once a connection is configured, it does not terminate until or unless one of the parties to the connection terminates the connection.

When a group enrolls in the system or at some point after enrollment, the institution and/or the group and/or the individual within a group may be provided with the option to present an advertisement for the institution and/or group. The advertisement may be presented in the list when a user performs a search for the particular group or institution or if a user performs a community level search. The bottom right portion of FIG. 4 illustrates an example of such an advertisement. Those skilled in the art will recognize that the advertisement illustrated is merely a non-limiting example and different advertisements and/or locations could be employed.

Figure 10:
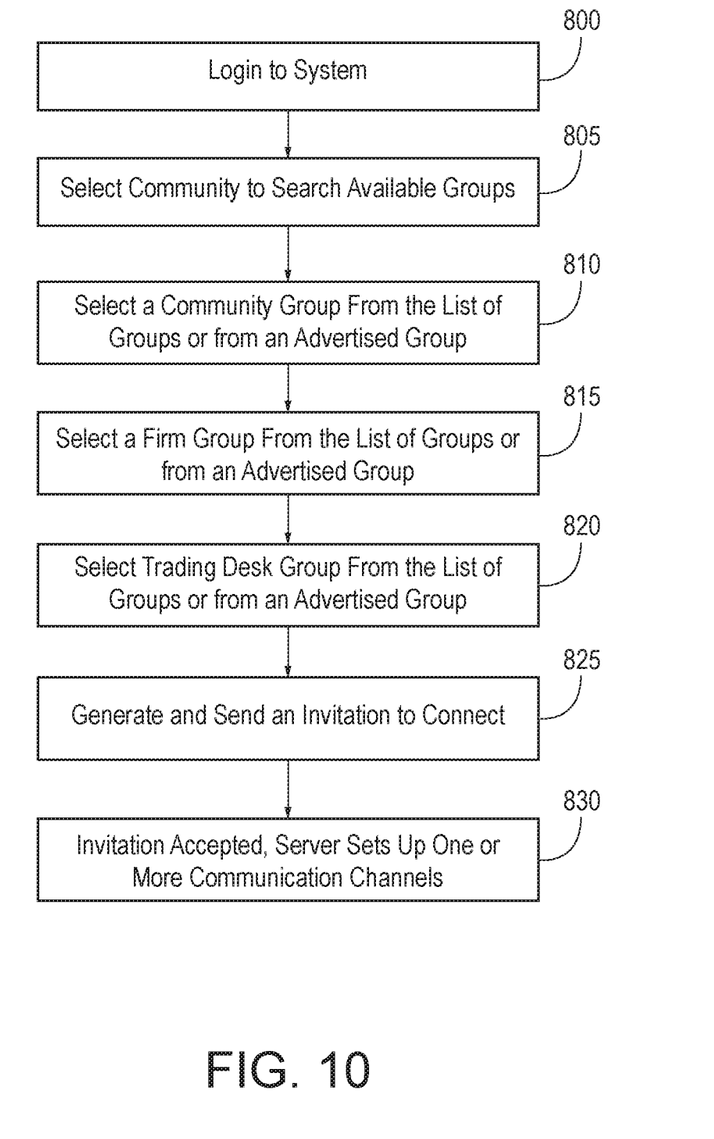

FIG. 10 provides a flow chart illustrating an exemplary setup of a communication channel between groups. At 800 an individual or group (collectively referred to as the individual for this discussion) logs into the system. At 805 the individual selects the community option to determine what communities are available for contacting. At 810 the individual selects a community group from the list of available communities or from the advertised communities. At 815 the individual selects a firm from the listed firms or from the advertised firms. At 820 the individual selects a trading desk from the list of trading desks. At 825 after selecting the trading desk, the individual creates and sends an invitation to connect to the selected trading desk. Once that trading desk accepts the invitation at step 830, the communication channel(s) is/are configured by the server.

Having thus described preferred embodiments of the invention, advantages can be appreciated. Variations from the described embodiments exist without departing from the scope of the invention. Thus it is seen that systems and methods are provided for generating group to group secure always on communications channels over a packet switched and/or frame relay network and/or any other non-circuit switched network which can transport these types of communications. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of Having described the invention, what is claimed as new and secured by Letters Patent is:

1. A method for setting up a secure private line connection over a packet-switched network between a plurality of customer premises equipment each running customer premises software (collectively referred to as CPS) respectively associated with groups of individuals who share at least one common trait, said method comprising:
   identifying, by performing with a CPS a search for groups who share at least one trait with a group performing the search, a remote group who shares at least one trait with the group performing the search for such groups;
   generating at the CPS an invitation for the remote group to connect via at least one type of private line connection with the group performing the search; and;
   a server setting up a private line connection, via the packet switched network, between the CPS associated with the group who performed the search and the CPS associated with the invited group in response to the invited group accepting the invitation.

2. The method according to claim 1 wherein the group performing the search contains a single individual.

3. The method according to claim 1 wherein said search includes a multi-tiered search which begins with a broadly defined group and narrows down to narrower defined groups with each tier.

4. The method according to claim 1 wherein generating the invitation includes populating a plurality of fields of a form and transmitting the populated form for receipt by the invited group.

5. The method according to claim 4 wherein the fields of the form include one or more fields from the group of fields consisting of: an identity of the group sending the invitation, an identity of the invitee, a label for a button to be presented on a default screen and a type of private line connection to create.

6. The method according to claim 1 further including the server setting up a video channel via the packet switched network, between the CPS associated with the group who performed the search and the CPS associated with the invited group.

7. The method according to claim 1 further including the server setting up an instant messaging channel via the packet switched network, between the CPS associated with the group who performed the search and the CPS associated with the invited group.

8. The method according to claim 1 wherein the private line connection is encrypted.

9. The method according to claim 1 further including, subsequent to the setup of the private line connection, the group performing the search determining an identity of every member of the invited group.

10. The method according to claim 1 wherein the private line connection is a Hoot & Holler connection.

11. A method for setting up a secure private line connection over a packet switched network between a plurality of customer premises equipment each running customer premises software (collectively referred to as CPS) respectively associated with groups of individuals who share at least one common trait, said method comprising:
   a group receiving an invitation, at a CPS associated with the group, to connect via at least one type of private line connection with a CPS associated with the group who sent the invitation;
   the group receiving the invitation accepting the invitation and transmitting the acceptance via the associated CPS to a server; and,
   the server setting up a private line connection, via the packet switched network, between the CPS associated with the group who received the invitation and the CPS associated with the group that sent the invitation.

12. The method according to claim 11 wherein each of the groups respectively include a single individual.

13. The method according to claim 11 wherein the invitation includes a plurality of fields which include one or more fields from the group of fields consisting of: an identity of the group sending the invitation, an identity of the invitee, a label for a button to be presented on a default screen and a type of connection to create.

14. The method according to claim 11 further including the server setting up a video channel and an instant messaging channel via the packet switched network, between the CPS associated with the group who received the invitation and the CPS associated with the group that sent the invitation.

15. The method according to claim 11 further including the server setting up a video channel via the packet switched network, between the CPS associated with the group who received the invitation and the CPS associated with the group that sent the invitation.

16. The method according to claim 11 further including the server setting up an instant messaging channel via the packet switched network, between the CPS associated with the group who received the invitation and the CPS associated with the group that sent the invitation.

17. The method according to claim 11 wherein the private line connection is encrypted.

18. The method according to claim 11 wherein the private line connection is a plurality of private line connections.

19. The method according to claim 11 wherein the private line connection is a Hoot & Holler connection.

20. A system for secure communications between groups of people located remote from each other, said system comprising:
   a customer premise equipment (CPE) associated with at least one group; the CPE having a graphical user interface, and a first non-transitory computer readable medium storing instructions for a software application ("app"), wherein when executed, the app displays a hierarchical list of remote groups, each having at least one trait in common with the at least one group; detects a selection from the list of groups and sends an invitation to the selected group to connect via at least one type of private line connection with the at least one group;
   a server having another non-transitory computer readable medium storing instructions that when executed by a processor cause the server to determine that the invitation was accepted, and configure a private line connection;
   wherein the private line connection is configured over a packet-switched network between the CPE associated with the at least one group and the CPE associated with the selected group.

21. The system according to claim 20 further including the CPE associated with the at least one group is configured to transmit encrypted communications for receipt by the CPE associated with the selected group; and,
   the CPE associated with the selected group is configured to receive and decode encrypted communications from the CPE associated with the at least one group.

22. The system according to claim 20 wherein the instructions further cause the server to configure an instant messaging channel over the packet-switched network between the CPE associated with the at least one group and the CPE associated with the selected group.

23. The system according to claim 20 wherein the instructions further cause the server to configure a video channel over the packet-switched network between the CPE associated with the at least one group and the CPE associated with the selected group.

24. The method according to claim 20 wherein the private line connection is a plurality of private line connections.

\* \* \* \* \*